United States Patent
Androski et al.

(10) Patent No.: US 6,842,513 B1
(45) Date of Patent: Jan. 11, 2005

(54) METHOD AND APPARATUS FOR PROVIDING TELECOMMUNICATIONS SERVICES

(75) Inventors: Frank J. Androski, Freehold, NJ (US); Promod Kumar Bhagat, Morganville, NJ (US); Saul Daniel Fishman, Highland Park, NJ (US); Sekar Ganesan, Ocean, NJ (US); Scott A. Sayers, Jackson, NJ (US); Smita Pradip Sheth, Marlboro, NJ (US)

(73) Assignee: AT&T Corp., New York, NY (US)

( * ) Notice: Subject to any disclaimer, the term of this patent is extended or adjusted under 35 U.S.C. 154(b) by 644 days.

(21) Appl. No.: 09/809,965

(22) Filed: Mar. 16, 2001

(51) Int. Cl.[7] .......................... H04L 12/66; H04M 7/00
(52) U.S. Cl. ............. 379/220.01; 370/352; 379/221.06; 379/230
(58) Field of Search ................. 370/351, 352, 370/354; 379/201.01, 207.02, 211.01, 211.02, 219, 220.01, 221.01, 221.02, 221.03, 221.05, 221.06, 221.08, 221.09, 221.13, 221.14, 230

(56) References Cited

U.S. PATENT DOCUMENTS 5,237,604 A * 8/1993 Ryan ..................... 379/221.14
5,590,181 A    12/1996 Hogan et al.
5,940,492 A * 8/1999 Galloway et al. ........... 379/230
5,946,379 A    8/1999 Bhusri
6,041,117 A    3/2000 Androski et al.
6,389,130 B1 * 5/2002 Shenoda et al. ....... 379/221.08
6,639,981 B1 * 10/2003 Dunn et al. ............ 379/221.13

* cited by examiner

Primary Examiner—Harry S. Hong

(57) ABSTRACT

To facilitate routing changes, a telecommunications network (10, 10', 10''') includes a centralized network routing database (28) queried by each ingress switch upon receipt of a call by a calling subscriber (12). In response to the query, the network routing database returns to the querying switch the identity on the next (downstream) switch in the routing path. The querying switch then translates the switch identity to establish the link to that next switch. Because each querying switch makes the necessary translation of the next switch identity to make the link to the next switch, the centralized network database need not concern itself with the particular characteristics of the switch. To make global routing changes, only the network routing database need be updated, not each individual switch.

24 Claims, 3 Drawing Sheets

METHOD AND APPARATUS FOR PROVIDING TELECOMMUNICATIONS SERVICES

TECHNICAL FIELD

This invention relates to a technique for routing telephone calls in a communications network with simplified administration of routing data.

BACKGROUND ART

In present day telecommunications networks, an incoming call, dialed by a calling party to a called party, enters the network at an ingress switch serving the calling party. The ingress switch routes the call to a terminating switch serving the called party, either directly, or through one of more intermediate (via) switches. In order to route a call, each switch typically performs a translation to establish a route list of trunks capable of carrying the call to the next switch. Often, multiple trunks link the various switches in a network, so call routing not only involves selecting the next switch, but also selecting the particular idle trunk linking the switches. Presently, each switch makes its own routing decisions. Thus, in a telecommunications network that embodies multiple switches using different technologies, such as Circuit-switching, ATM switching or IP routing, often from different vendors, making routing changes becomes very cumbersome. Unfortunately, with growing demand for telecommunications services, routing changes occur frequently, as new switches are deployed.

In an effort to overcome the difficulty of having to update existing switches in a telecommunications network, there currently exist proposals for employing a new exterior processor with each existing switch to make call control decisions for implementation by the existing switches which then perform switch fabric functions. For example, U.S. Pat. No. 6,041,117, issued in the name of Frank Androski et al., and assigned to AT&T Corp., discloses a distributed communications system in which individual switching systems are controlled by an exterior switch processing platform. The switch processing platform performs call-associated logic functions, such as address translation and routing functions previously performed by the internal switch call processor, whereas each switch performs switch fabric (call connection) functions, including reserving, connecting and releasing trunks.

U.S. Pat. No. 5,590,181, issued in the name Steven Hogan et al. discloses a call processing system comprised of at least one network switch linked to a network control processor that makes call handling and routing determinations for that switch. Only the audio portion of a call is received at a switch for transmission to a subsequent switch. The network control processor makes all call processing and call-handling decisions.

The aforementioned Androski et al. '117 patent and the Hogan et al '181 patent employ call processing platforms that make call logic decisions and thereafter provide the information to each switch. Implementing these techniques requires the development of new interfaces to allow present-day switches to receive the information from the separate call processing application platform since present day switches are not presently adapted to do so. Modifying present day switches to accept such special interfaces could prove expensive and time consuming.

Thus, there is a need for a technique for achieving centralized call routing that overcomes the disadvantages of the prior art.

BRIEF SUMMARY OF THE INVENTION

Briefly, the present invention provides a method for processing calls in a telecommunications network that utilizes a centralized database accessed by individual switches to obtain routing information for call processing. In accordance with a preferred embodiment, upon receipt of a call at a receiving switch within the telecommunications network, the switch launches a query, typically via a known protocol, such as the widely known Transactional Capabilities Application Part (TCAP) protocol, to a routing database. In response to the query, the database returns the identity of the downstream (next) switch in the call routing path that typically takes the form of a list of one or more switches, including via switches. The next switch identity may take the form of a Destination Pont Code (DPC) provided in an SS7 signaling message to the receiving switch or a next switch identity message (NSI) that may take the some other form, such as the IP address for signaling of the next switch. Upon receipt of the downstream switch identity, the receiving switch then initiates a link to downstream switch for to route the call thereto. The manner in which the receiving switch initiates the link will depend on the switch technology. If the receiving switch is circuit-based, the switch maps the DPC to the trunk group associated with the downstream switch before sending an Initial Address Message (IAM) with a Circuit Identification Code (CIC) to the downstream switch. If the receiving switch is packet-based, the switch uses the DPC to send the IAM the downstream switch along with a call identification code. In response, the downstream switch establishes a connection to the receiving switch over a packet network.

The method of the invention advantageously overcomes the difficulty of accommodating different switches from different vendors with different routing translations within the same network. In accordance with the invention, each switch queries the central routing database using the TCAP query protocol normally used by the switch for other database queries. Other query protocols, such as SIP or Parlay could also be employed. The switch making the query receives a DPC to initiate the connection with the next switch. The switch itself performs the necessary connection translations in response to DPC received from the routing database. Thus, the centralized routing database need not concern itself with particular type of switch, only with the destination of the call. Thus, only one version of the routing translation need be provisioned in the routing database, avoiding the need to provision the routing translation in each switch in accordance with the particular format established by the switch vendor.

DETAILED DESCRIPTION

Figure 1:
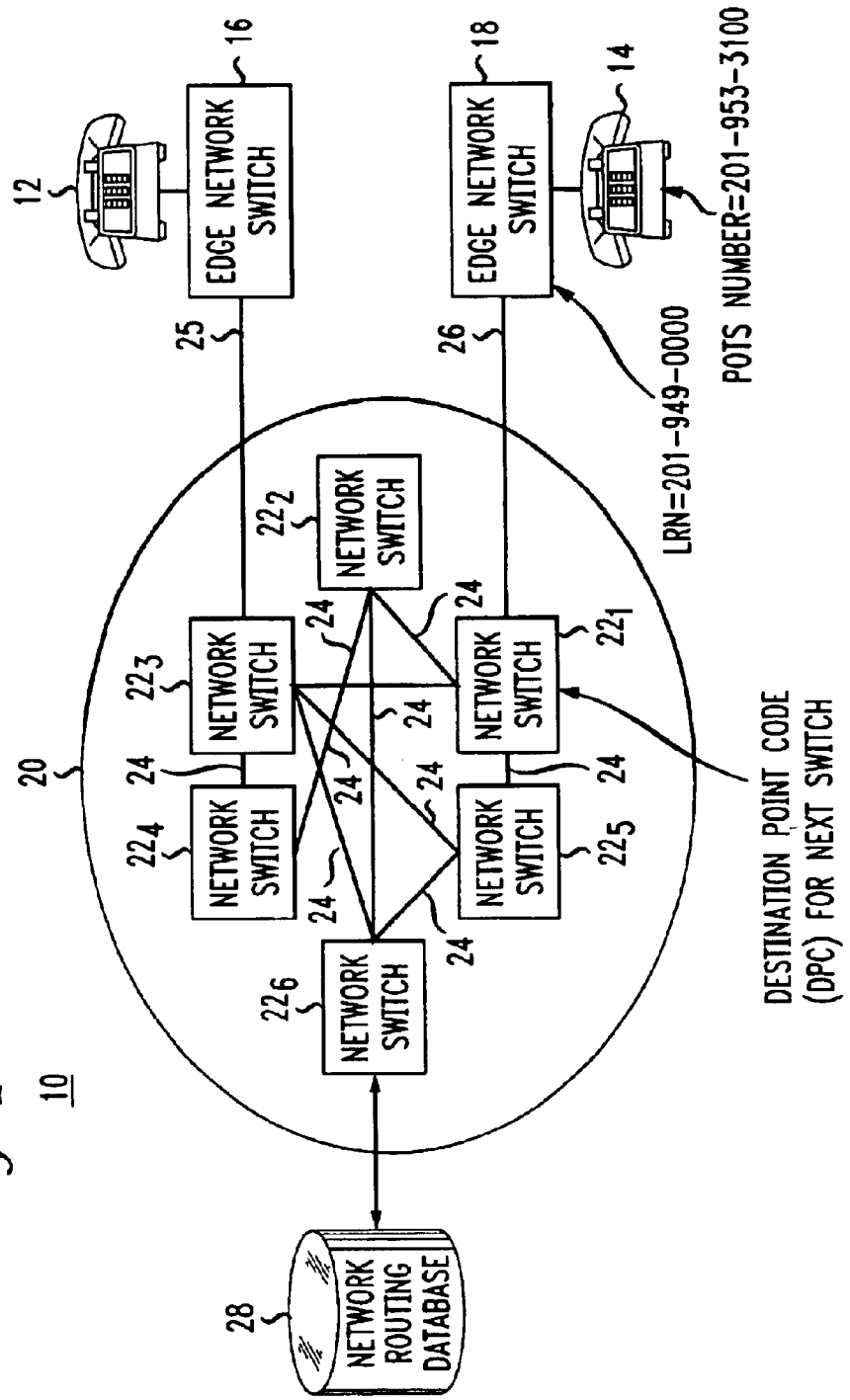
FIG. 1 depicts a block schematic diagram of a circuit-switched-based telecommunications network for implementing the routing technique of the invention.

FIG. 1 depicts a block schematic diagram of a circuit-switched telecommunications network 10 for routing a telephone call from a calling party, represented by a first telephone set 12, to a called party, represented by a second telephone set 14. In the illustrated embodiment of FIG. 1, the telephone sets 12 and 14 receive local telephone service (e.g., dial tone) from edge switches 16 and 18, respectively, each linked to, but lying outside and at the edge of an Inter-exchange Carrier (IXC) network 20, such as the inter-exchange network maintained by AT&T. In practice, each edge switch may comprise a class 5 central office switch, such as the 5ESS switch now manufactured by Lucent Technologies, Inc., or a DMS 100 switch manufactured by Nortel Networks, Inc. The edge switches 16 and 18 could belong to a single provider of local service, or could belong to separate local service providers. Alternatively, one or both of the edge switches 16 and 18 could serve as an extension of the IXC network 20 to provide local nodal telephone service.

The IXC network 20 comprises a plurality of toll switches $22_1, 22_2, \ldots 22_n$ where n is an integer. In the embodiment of FIG. 1, n=6 although in practice, the IXC network 20 could contain a larger or smaller number of switches. Links 24—24 connect the various switches $22_1$–$22_n$. While FIG. 1 illustrates only a single link 24 connecting a pair of switches, in practice, multiple links may connect a pair of switches. At least one switch, (i.e., switch $22_3$) enjoys a connection 25 with the edge switch 16, while at least one other switch (i.e., switch $22_1$) enjoys a connection 26 with the edge switch 18. Thus, switches 16 and 18 are "homed to switches $22_3$ and $22_1$", respectively. For an originating call dialed by the calling party 12 to the called party 14, the toll switches $22_3$ and $22_1$ become the ingress and egress toll switches, respectively.

In the past, an ingress toll switch, such as toll switch $22_3$, receiving a call from an originating edge switch, such as edge switch 16, would make its own routing decisions by selecting an outbound trunk that determines both the next switch, and how the bearer channel is sent over that trunk. In the same fashion, the next switch receiving the call from the ingress toll switch must select the outbound trunk, thereby determining the succeeding switch. The process by which each switch selects a trunk, hereinafter referred to as a routing translation, depends on the type of switch, as well as its manufacturer. Since routing translations occur at the individual switches, making routing changes, such as adding or deleting a route to a switch, becomes very cumbersome.

In accordance with the present principles, the network 10 advantageously includes a central routing database 28 that contains the routing information, and more particularly, the switch destinations, to enable each toll switch to route a call. The network routing database 28 interacts with the switches $22_1$–$22_n$ in the following manner. Upon receiving a call, a toll switch launches a query to the routing database 28, typically using a well-known protocol, such as the Transactional Capabilities Application Part (TCAP), to provide the routing database with information about the dialed call, such as the called number itself. Most existing telecommunications switches already possess the capability of launching a TCAP query, typically via an out-of-band signaling link, such as an SS7 link, so having each switch query the centralized routing database 28 via a TCAP query poses no technical difficulty. Other query protocols such as the SIP or Parlay protocols could also be employed In response to such a TCAP query, the network routing database 28 returns to the querying switch (e.g., the toll switch $22_3$) the identity of the next switch in the call set-up path. Thus, for example, for a TCAP query launched by the toll switch $22_3$ in response to a call dialed by the calling party 12 to the called party 14, the routing database 28 will likely identify toll switch $22_1$ as the next (destination) switch. In practice, the routing database 28 will typically identify the next switch in the call set-up path using the SS7 Destination Point Code (DPC) or another Network Switch Identifier (NSI) (for example, an IP address for a packet switch using Session Initiation Protocol (SIP). If several switches must be traversed, the routing database 28 will return a sequence of switch identities.

In response to the DPC (or other NSI) returned by the network routing database 28, the querying switch (e.g., switch $22_3$) then makes the necessary translation to select the required trunk on which to route call. In practice, each switch possesses the native ability to make such a translation. Thus, the network routing database 28 need not concern itself with the details of translating the switch identity into the necessary path selection details, because each switch can accomplish this task itself. Rather, the routing database 28 need only contain information regarding the topology of switches in the IXC network 20. Thus, when changes occur in the IXC network 10 regarding switch topology, such as the addition or deletion of a switch or a re-home of an edge switch from one network switch to another or a change in the connections (e.g., routes) between switches, only the routing database 28 need be updated, thus avoiding the need to update each switch. Also, centralizing the routing information in the database 28 affords the ability to better manage the network 20 in the event of a need to route traffic away from a failed switch. Thus, a single update to the database 20 can accomplish the routing changes needed to in the event of a hard-to-reach switch, a need to skip a particular route, or to accomplish a specific route, rather than have to update the switches individually.

Rather than serve only the switches within the network 20, the routing database 28 could also serve switches outside the network as well. For example, to the extent that an edge switch enjoys links to multiple network switches, the routing database 28 could provide the routing information directly to the edge switch, allowing it to effectively route calls to different switches in the network.

In addition to providing the identity of the downstream switch, the routing database 28 can also provide the trunk selection information for a terminating switch, (or even an intermediate switch for that matter.) Thus, the database 28 could provide a terminating switch (or an intermediate switch) with the trunk selection information as well, to facilitate selection of a particular trunk on which to route a call. Moreover, the routing database 28 can provide a terminating switch with certain call control information, such as which if any digits to outpulse to the called party. The technique of sending the DPC to the switch allows the IAM message to be sent to the next switch in connection with the circuit switched network 10 of FIG. 1. In connection with the circuit-switched network of FIG. 1., a first switch would have to map the DPC to the trunk group associated with the DPC in order to select a circuit before the IAM with a Circuit Identification Code is sent to the next switch. The ability to translate the DPC into the trunk group is a function that is inherent in existing circuit switches.

In accordance with another aspect of the present invention, the network routing database 28 may also include a database of location routing numbers to facilitate local number portability. Within many individual Local Access and Transport Areas (LATAs) served by one or more Local Exchange Carriers (LECs), such as the LATA containing edge switch 18, individual subscribers, such as the subscriber 14, may enjoy local number portability, that is the ability to retain a particular telephone number even if the subscriber later receives service from a different local service provider. For example, consider the scenario when the subscriber 14 originally receives local telephone service on the telephone number 201-953-3100, so that the subscriber is thus served by an edge switch within the "953" exchange. Assume that the same subscriber later chooses to receive service from a different service provider, with an edge switch having a different telephone exchange, say the "949" exchange. If the subscriber elects to retain the original number after having changed local service providers, then the telephone network 10, and particularly, the IXC network 20 must account for such number portability in order to properly route calls to the subscriber 14.

In accordance with a preferred embodiment, the network routing database 28 also includes a table of location routing numbers that translate the subscriber's original number to a routing number that enables the network 10, and particularly, the IXC network 20, to direct the call for the subscriber. For example, the subscriber whose original POTS number was 201-953-3000, but now receives service from a different service provider having a switch in the "949" exchange, will have an assigned location routing number, e.g., 201-949-0000. Upon the receipt of a dialed number at an ingress toll switch, say switch $22_3$, the ingress switch queries the network routing database 28 to first determine the location routing number, if any, assigned to the dialed number. Thereafter, the network routing database, having established the location routing number, then uses such information to determine the call routing, and in particular, the DPC or NSI, as described previously. In response to the query, the network routing database 28 returns the DPC or NSI to the ingress switch, which, in turn performs the necessary translation to select the appropriate trunk to the next switch, as specified by the network routing database.

Figure 2:
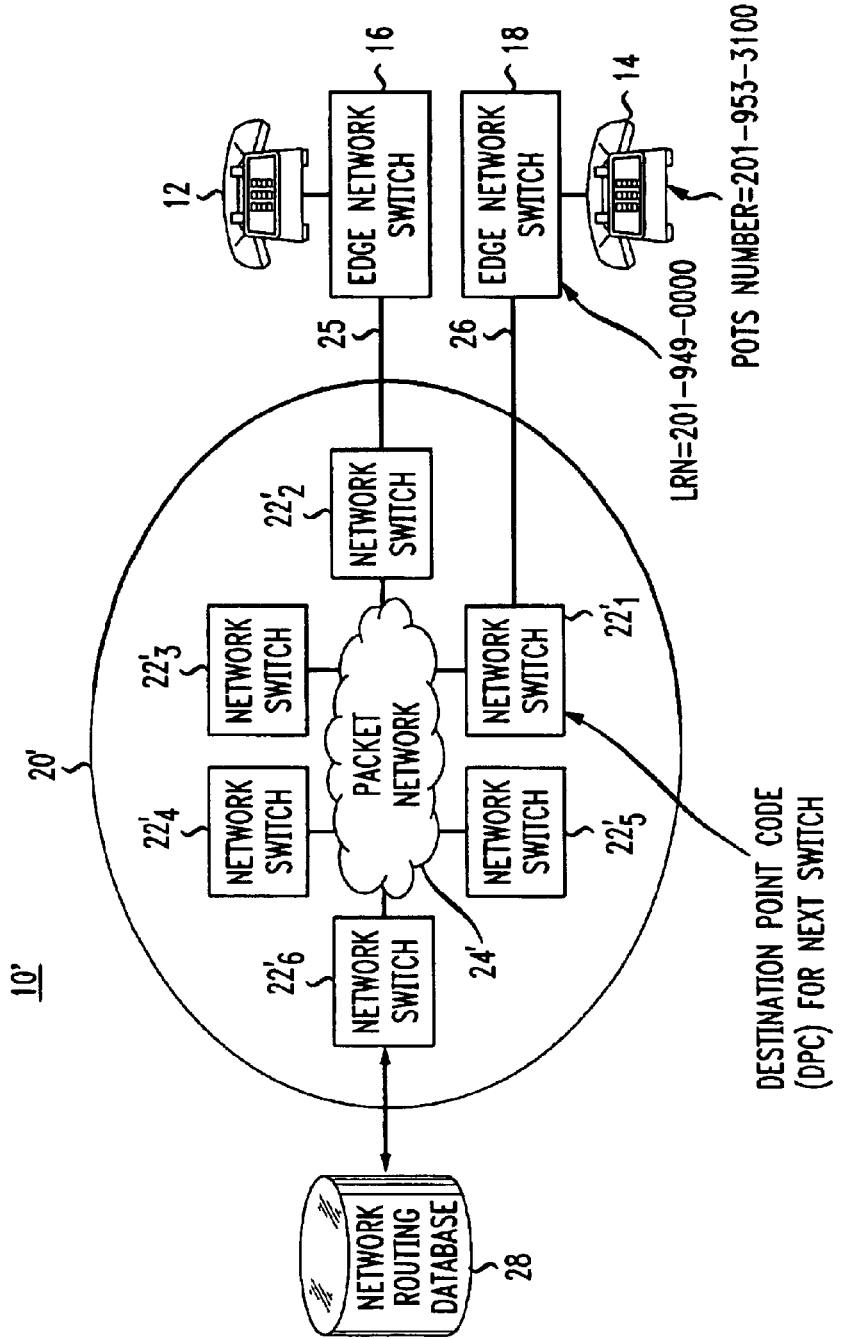
FIG. 2 depicts a block schematic diagram of a packet-based network telecommunications network for implementing the routing technique of the invention.

FIG. 2 illustrates a second preferred embodiment of a telecommunications network 10' for practicing the invention. The network 10' of FIG. 2 shares some of the same features as the network 10 of FIG. 1 so like reference numbers have been used to designate like elements. Thus, like the network 10 of FIG. 1, the network 10' of FIG. 2 comprises edge switches 16 and 18 that provide local service to subscribers 12 and 14, respectively. (As described previously, the edge switches 16 and 18 may belong to the same or different local service providers.) Also, the network 10' of FIG. 2 includes a network routing database 28. The network 10' differs from the network 10 of FIG. 1 in the following respect. Whereas the network 10 of FIG. 1 includes an IXC network 20 comprised of a plurality of circuit switches $22_1$–$22_6$, the network 10' of FIG. 2 includes an IXC network 20' comprising a plurality of packet switches $22'_1$–$22'_6$ linked to each other through a packet network 24'.

As compared to the circuit switches based switches $22_1$–$22_6$, of FIG. 1, the packet-based switches $22'_1$–$22'_6$ of FIG. 2 may employ Bearer Independent Call Control Signaling (BICC), as embodied with ANSI Standard T1.672. Such BICC signal capability allows each of the packet switches $22'_1$–$22'_6$ to separate call control from bearer connection and to identify the next switch for the call for the purposes of sending a BICC Initial Address Message (IAM) to the next switch in the routing path as identified by the DPC (or NSI) as obtained by querying the network routing database 28. The BICC IAM contains a Call Identification Code, which is sent back to the preceding switch in a CONNECT message, so that the preceding switch can associate the bearer connection to the call. The bearer path for the call is then set up in the backward direction from the receiving switch to the preceding switch using the capabilities of the packet network 24'. For ATM, a CONNECT message is signaled across the packet network 24' from the receiving switch to preceding switch. Instead of a fixed connection between switches, the packet network 24' routes the bearer paths between the packet switches $22'_1$–$22'_6$. At the call control layer, calls are routed over Virtual Trunk Groups, rather trunk groups consisting of a set or fixed connection. The Virtual Trunk groups represent the call carrying capability of the packet network 24' for transporting the bearer connections.

The BICC method affords the opportunity to simplify the manner in which the Network Routing Database 28 informs a switch how to route a call. The switch does not need to identify a specific trunk or fixed connection, to route the call. The DPC of the next switch in the path, as provided by the network routing database 28 to the querying switch, determines where the IAM message should be sent. The capabilities of the packet network 24' are then used to set up the bearer, independently from the call control routing decision.

The network 10' of FIG. 2 serves to route a call from a calling subscriber (e.g., subscriber 12) to a called subscriber (subscriber 14) by querying the network routing database in much the same way as the network 10 routes calls. When a toll switch, (e.g., switch $22'_2$) within the IXC network 20' of FIG. 2 receives a call destined for a called party (e.g., subscriber 14), the switch launches a query to the network routing database 28. In response to the query, the network routing database 28 first establishes the location routing number, if any, for the called party, (assuming local number portability has been implemented.) Thereafter, the network routing database 28 of FIG. 2 will then determine the next switch (or switches) in the path. In contrast to the circuit-switched IXC network 20 of FIG. 1 in which the ingress switch sets up a path to the next downstream switch to reach the terminating switch, in the IXC network 20' of FIG. 2, the terminating packet switch (e.g., switch $22'_1$) sets up a bearer path to the ingress switch through the packet network 24'. The network switch 22' forwards the call to the edge switch 18, which completes the call to the subscriber 14.

Figure 3:
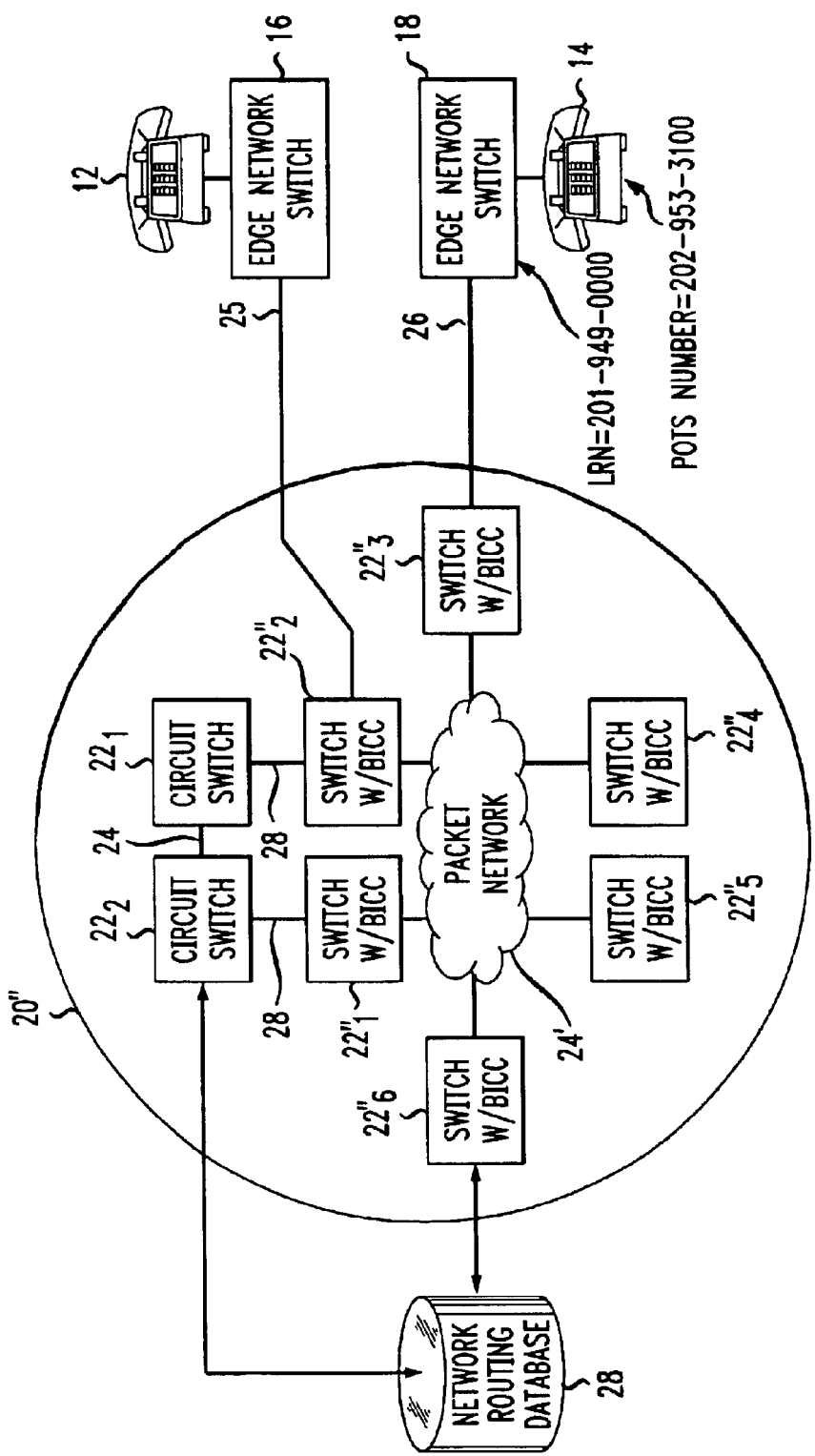
FIG. 3 depicts a block schematic diagram of combination circuit-switched and packet-based network telecommunications network for implementing the routing technique of the invention.

FIG. 3 depicts a third embodiment 10" of telecommunications network for routing calls from a calling party (e.g., subscriber 12) to a called party (e.g., subscriber 14). The network 10" of FIG. 3 shares many of the same features as the networks 10 of FIG. 1 and network 10' of FIG. 2 so like reference numbers have been used to designate like elements. Thus, like the network 10 of FIG. 1, the network 10" of FIG. 3 comprises edge switches 16 and 18 that provide local service to subscribers 12 and 14, respectively. Further, like IXC network 20 in the network 10 of FIG. 1, the IXC network 20" of FIG. 3 includes a plurality of circuit switches, represented by circuit switches $22_1$ and $22_2$. Also, like the network 10' of FIG. 2, the IXC 20" of the network 10" of FIG. 3 includes a plurality of packet switches (e.g., switches $22''_1$–$22''_6$). At least some of the circuit switches are linked to each other via at least one link 24 while at least one of the packet switches is linked to at least one circuit switch via a link 29. The packet switches $22''_1$–$22''_6$ are linked to each other through a packet network 24'. As discussed below, the switches $22_1$ and $22_2$ and the packet switches $22''_1$–$22''_6$ receive routing data from a network routing database 28 as previously discussed with respect to FIGS. 1 and 2.

Like, the packet switches $22'_1$–$22'_6$ within the network 10' of FIG. 2, the packet switches $22''_1$–$22''_6$ of FIG. 3 utilize Bearer Independent Call Control (BICC) signaling as described in ANSI standard T1.672. The BICC signaling capability of the packet switches $22''_1$–$22''_6$ of FIG. 3 allows each switch to separate call control from bearer connection so that each switch sends a BICC Initial Address Message (IAM) to the next switch in the routing path as identified by the DPC (or NSI) as obtained by querying the network routing database 28. As discussed, the BICC IAM contains a Call Identification Code, which is sent back to the preceding switch in a CONNECT message, so that the preceding switch can associate the bearer connection to the call. The bearer path for the call is then set up in the backward direction from the receiving switch to the preceding switch using the capabilities of the packet network 24'. For ATM, a CONNECT message is signaled across the packet network 24' to from receiving switch to preceding switch. Instead of a fixed connection between switches, the packet network 24' is used to route the bearer paths between the packet switches $22''_1$–$22''_6$. At the call control layer, calls are routed over Virtual Trunk Groups, rather than trunk groups consisting of a set or fixed connection. The Virtual Trunk group represents the call carrying capability of the packet network 24' used to transport the bearer connections.

The BICC method affords the opportunity to simplify the manner in which the Network Routing Database 28 informs a switch how to route a call. The switch does not need to identify a specific trunk or fixed connection, to route the call. The DPC of the next switch in the path, as provided by the network routing database to the querying switch, determines where the IAM message should be sent. The capabilities of the packet network 24' are then used to set up the bearer, independently from the call control routing decision. While the technique of sending the DPC to the switch to allow the IAM message to be sent to the next switch works readily with BICC, it can also be applied to the older circuit switching methodology. In connection with circuit switching, the switch would have to map the DPC to the trunk group associated with the DPC in order to select a circuit before the IAM with a Circuit Identification Code is sent to the next switch. As discussed above with respect to FIG. 1, the ability to translate the DPC into the trunk group is a function that is inherent in existing circuit switches.

The network 10" of FIG. 3 serves to route a call from a calling subscriber (e.g., subscriber 12) to a called subscriber (subscriber 14) by querying the network routing database in much the same the network 10 routes calls. When a toll switch, (e.g., switch 22") within the IXC network 20' of FIG. 1 receives a call destined for a called party (e.g., subscriber 14), the switch launches a query to the network routing database 28. In response to the query, the network routing database 28 first establishes the location routing number, if any, for the called party, (assuming local number portability has been implemented.) Thereafter, the network routing database 28 of FIG. 2 will then determine the next switch (or switches) in the path and provide that information in the form of a DPC (or NSI). As discussed above, upon receipt of a call, the packet switches use the routing information to set up a bearer connection within the packet network.

The foregoing describes a technique for routing calls in a communications network utilizing a centralized database accessed by individual switches to obtain routing information for call processing.

The above-described embodiments merely illustrate the principles of the invention. Those skilled in the art may make various modifications and changes that will embody the principles of the invention and fall within the spirit and scope thereof.

What is claimed is:

1. A method for routing a call within a telecommunications network containing switches to direct the call dialed by an originating subscriber to a terminating subscriber, the method comprising:

receiving the call at a first switch within the network, the first switch being of a first technology;

launching a query from the first switch to a centralized network routing database having information representing a topology of the switches;

in response to the query, the network routing database returning to the first switch an identity of at least one downstream switch to which the call is next to be routed along a downstream path that is also determined by the network routing database and that includes plural switches within the network, the downstream switch being of a second technology that is different from the first technology of the first switch; and initiating a link from the first switch to the downstream switch identified by the network routing database to enable the first switch to route the call to the downstream switch for ultimate delivery to the terminating subscriber via the downstream path determined by the network routing database.

2. The method according to claim 1 wherein the query is launched from the first switch to the network routing database via a SS7 link.

3. The method according to claim 1 wherein the query utilizes one of a Transactional Capabilities Application Part (TCAP), SIP or Parley protocol.

4. The method according to claim 2 wherein the identity of the one downstream switch is returned as a Destination Point Code.

5. The method according to claim 2 wherein the identity of the one downstream switch is returned as a Next Switch Identifier.

6. The method according to claim 1 wherein the step of initiating a link from the first switch to the one downstream switch includes the step of transmitting an Initial Address Message (IAM) to the downstream switch, which, in response, establishes a link in a backward direction to the first switch via a packet network.

7. The method according to claim 1 wherein the step of initiating a link from the first switch to the one downstream switch includes the steps of:

translating the identity of the next switch to identify at least one trunk group linking the first switch to the downstream switch; and selecting said one trunk group.

8. The method according to claim 1 wherein centralized network routing switch returns a sequence of downstream switches to which the which the call is to be routed.

9. The method according to claim 6 wherein the first switch initiates a link to the one downstream switch by sending the Initial Address message using Bearer Independent Call Control Signaling.

10. The method according to claim 9 wherein the one downstream switch sets up a connection to the first switch in a backward direction.

11. The method according to claim 1 wherein the network routing database, in response to the query launched by the first switch, first establishes a location routing number for the call received at the first switch, and in accordance with the location routing number, then returns the identity of the one downstream switch.

12. The method according to claim 1 wherein the step of launching a query to the routing database also includes launching a query to establish a location routing number.

13. The method according to claim 12 wherein the query to establish the location routing number is launched to the routing database.

14. The method according to claim 12 wherein the query to establish the location routing number is launched to a separate database.

15. The method according to claim 1 including the step of updating the routing database in response to a need to route traffic away a failed switch to afford the ability to better manage the communications network.

16. The method according to claim 1 wherein the routing database can receive a query from a switch outside the network.

17. The method according to claim 1 wherein the routing database also returns trunk selection information for receipt by a downstream switch.

18. A method for routing a call within a telecommunications network containing switches to direct the call dialed by an originating subscriber to a terminating subscriber, the method comprising:

receiving the call at a first switch within the network, the first switch being of a first technology;

launching a query from the first switch to a centralized network routing database via a SS7 link, the network routing database having information representing a topology of the switches;

the network routing database, in response to the query, returning to the first switch an identity in the form of one of a Destination Point Code (DPC) or Next Switch Identifier (NSI) of at least one downstream switch to which the call is next to be routed along a downstream path that is also determined by the network routing database and that includes plural switches within the network, the downstream switch being of a second technology that is different from the first technology of the first switch; and initiating a link from the first switch to the downstream switch identified by the network routing database to enable the first switch to route the call to the downstream switch for ultimate delivery to the terminating subscriber via the downstream path determined by the network routine database.

19. A method for routing a call within a telecommunications network containing switches to direct the call dialed by an originating subscriber to a terminating subscriber, comprising the steps of:

receiving the call at a first switch within the network, the first switch being of a first technology;

launching a query from the first switch to a centralized network routing database having information representing a topology of the switches;

in response to the query, the network routing database first establishing a location routing number for the call received at the first switch, and in accordance with the location routing number, then returning the identity of the one downstream switch to which the call is next to be routed along a downstream path that is also determined by the network routing database and that includes plural switches within the network, the downstream switch being of a second technology that is different from the first technology of the first switch; and initiating a link from the first switch to the downstream switch identified by the network routing database to enable the first switch to route the call to the downstream switch for ultimate delivery to the terminating subscriber via the downstream path determined by the network routing database.

20. A method for routing a call within a telecommunications network containing switches to direct the call dialed by an originating subscriber to a terminating subscriber, the method comprising:

receiving the call at a first switch within the network, the first switch being of a first technology;

launching a query utilizing a Transactional Capabilities Application Part (TCAP) protocol from the first switch to a centralized network routing database having information representing a topology of the switches;

in response to the query, the network routing database returning to the first switch an identity of at least one downstream switch to which the call is next to be routed along a downstream path that is also determined by the network routing database and that includes plural switches within the network, the downstream switch being of a second technology that is different from the first technology of the first switch; and initiating a link from the first switch to the downstream switch identified by the network routing database to enable the first switch to route the call to the downstream switch for ultimate delivery to the terminating subscriber via the downstream path determined by the network routing database.

21. The method of claim 1, wherein:

the first and second technologies are from a group including circuit switching technology, asynchronous transfer mode (ATM) technology and internet protocol (IP) technology.

22. The method of claim 18, wherein:

the first and second technologies are from a group including circuit switching technology, asynchronous transfer mode (ATM) technology and internet protocol (IP) technology.

23. The method of claim 19, wherein:

the first and second technologies are from a group including circuit switching technology, asynchronous transfer mode (ATM) technology and internet protocol (IP) technology.

24. The method of claim 20, wherein:

the first and second technologies are from a group including circuit switching technology, asynchronous transfer mode (ATM) technology and internet protocol (IP) technology.

* * * * *